May 12, 1959  L. M. STRUNK  2,886,118
VEHICLE STEERING MECHANISM
Filed July 15, 1957  3 Sheets-Sheet 1

INVENTOR.
LEONARD M. STRUNK
BY
ATTORNEY.

May 12, 1959   L. M. STRUNK   2,886,118
VEHICLE STEERING MECHANISM
Filed July 15, 1957   3 Sheets-Sheet 2
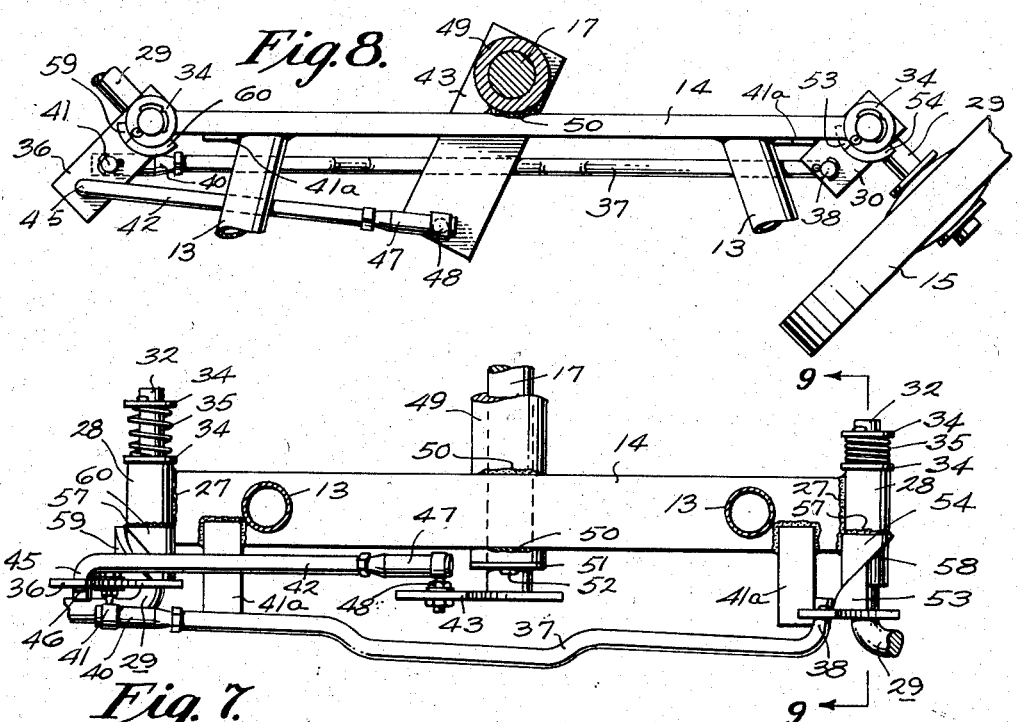
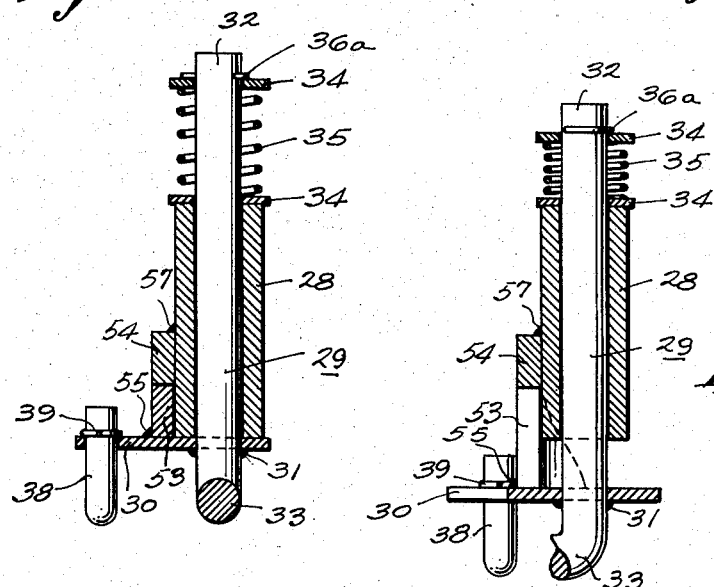
INVENTOR.
LEONARD M. STRUNK
BY
ATTORNEY.

May 12, 1959　　　　　　L. M. STRUNK　　　　　　2,886,118
VEHICLE STEERING MECHANISM
Filed July 15, 1957　　　　　　　　　　　　3 Sheets-Sheet 3
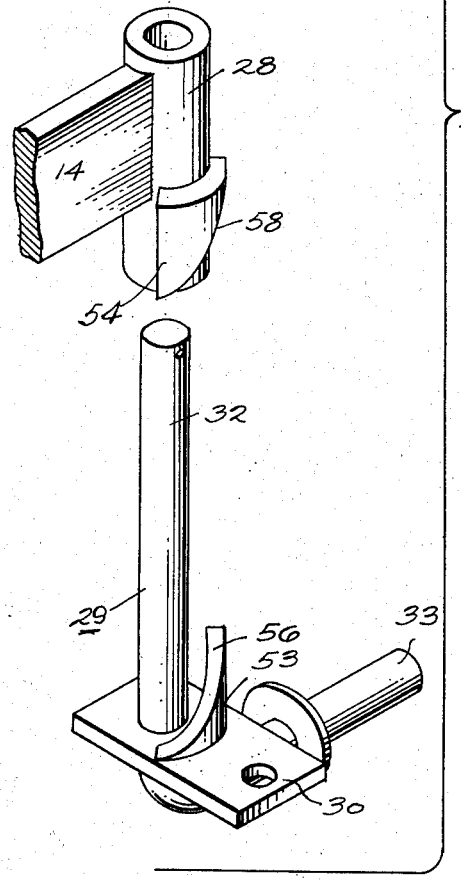
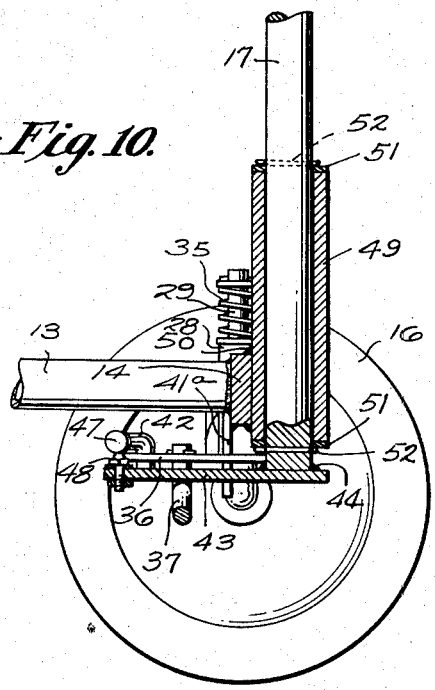
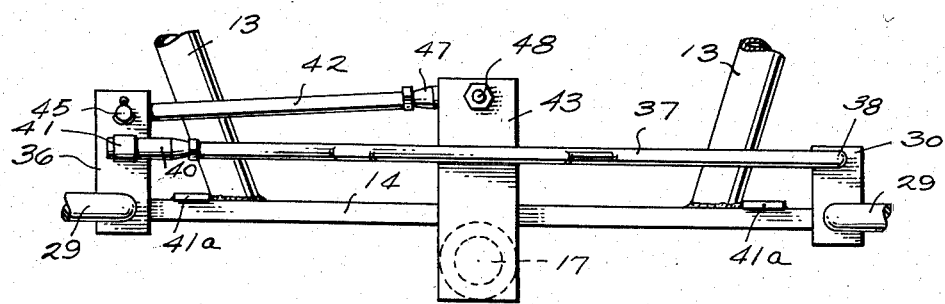
INVENTOR.
LEONARD M. STRUNK
BY
ATTORNEY.

United States Patent Office 2,886,118
Patented May 12, 1959

2,886,118

VEHICLE STEERING MECHANISM

Leonard M. Strunk, Coatesville, Pa.

Application July 15, 1957, Serial No. 671,873

8 Claims. (Cl. 180—6.26)

This invention relates generally to wheeled mobile frames and more particularly to an improved construction of means for maneuvering the same.

A principal object of the present invention is to provide such a frame with means automatically responsive to operation of the steering gear and operating to simulate a differential drive while the mobile frame is being turned to the right or to the left.

Another principal object of the present invention is to provide such a frame having a pair of widely spaced front dirigible and a pair of widely spaced rear traction wheels with means automatically responsive to operation of the steering mechanism for effectively shifting the weight of the vehicle to one of the dirigible wheels and the diagonally disposed traction wheel, whereby the loaded traction wheel operates to turn the vehicle about the loaded dirigible wheel while the unloaded traction wheel operates ineffectively and the unloaded dirigible wheel acts as a balance wheel.

Still another object of the present invention is to provide such a frame wherein the simulated differential drive is effected through the medium of cams operatively interposed between the dirigible wheels and the fore end of the mobile frame and responsive to operation of the steering mechanism for selectively elevating the fore corners of the mobile frame.

Further objects and advantages of the present invention will appear more fully hereinafter, it being understood that the present invention consists in the combination, construction, location and relative arrangement of parts, all as will appear more fully hereinafter, as shown in the accompanying drawings and as finally pointed out in the appended claims.

In the accompanying drawings:

Figure 4 is a vertical section on line 4—4 of Figure 2.

Figure 5 is a bottom view as indicated by line 5—5 of Figure 2.

Figure 6 is an enlarged vertical section on line 6—6 of Figure 2.

Figure 7 is a section similar to Figure 2 but shows in elevation the several parts positioned for making a right hand turn.

Figure 8 is a section similar to Figure 3 but shows in plan the several parts as positioned in Figure 7.

Figure 9 is an enlarged vertical section on line 9—9 of Figure 7.

Figure 10 is an exploded view showing the means for mounting a dirigible wheel and the cam means operatively intervening the dirigible wheel and the fore end of the mobile frame.

Figure 1:
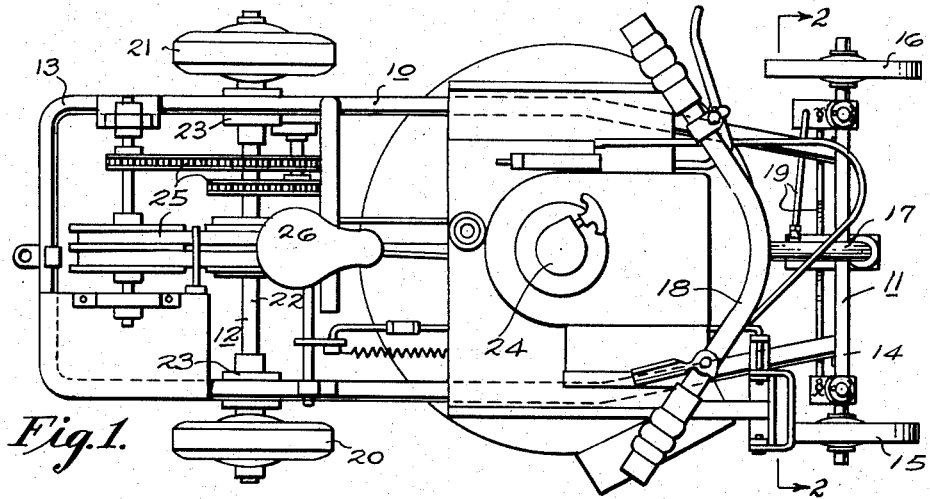
Figure 1 is a plan view of a mobile frame constructed in accordance with and embodying the principles of the present invention.

The mobile frame constructed in accordance with and embodying the principles of the present invention comprises a horizontally extending rigid frame structure, indicated generally by the numeral 10, that is carried upon dirigible front and traction rear running gear assemblies, respectively indicated generally by the numerals 11 and 12.

The rigid frame structure 10 includes a tubular member 13 that is generally of U-shape and which has corresponding fore end portions rigidly secured, as by welding, to a rigid cross bar 14 at the fore end of the vehicle. The opposite end portions of this cross bar 14 mount the dirigible wheels, indicated by the numerals 15 and 16, which wheels are operatively connected to a steering post 17 and handle bars 18 by means indicated generally by the numeral 19, to be described hereinafter. The traction wheels, indicated by the numerals 20 and 21, are mounted upon the opposite end portions of a rear axle 22 that projects through a pair of bearings 23—23 which depend from corresponding opposite side portions of the tubular frame member 13. On the frame structure 10, between the front running gear 11 and the rear running gear 12, is a power unit, indicated generally by the numeral 24, and operatively intervening the power unit 24 and the rear running gear 12 is a drive assembly, indicated generally by the numeral 25, for transmitting power to the traction wheels 20 and 21. It will be understood that a seat 26 is provided for the operator, and that suitable means are provided for control of the vehicle by the operator seated at his station.

Rigidly secured to the terminal portion of the cross bar 14 that is proximate the dirigible wheel 15, as by welding 27, is a vertically extending tubular sleeve 28, and turnably fitted into this sleeve 28 is a vertically extending portion of an axle bar 29 that terminates at its lower end in a horizontally extending portion which revolubly mounts the wheel 15.

Extending horizontally rearwardly from the axle bar 29, normal to each branch thereof, is a flat bar arm 30 that is rigidly secured, as by welding 31, to the axle bar vertically extending branch, designated 32. The fore end portion of the arm 30 abuts the lower end of the sleeve 28 and is disposed proximate the axle bar horizontally extending branch, designated 33.

Fitted over the upper end of the axle bar portion 32 is an assembly including a pair of axially spaced washers 34—34 and an intervening coil compression spring 35, all secured against displacement by a cotter pin 36a. It will be understood that the dirigible wheel 16 is mounted upon the cross bar 14 in the identical manner just described for mounting the dirigible wheel 15 upon the cross bar 14. The flat bar arm, indicated by the numeral 36, however, is somewhat longer than the flat bar arm 30.

The means 19 for connecting the dirigible wheels 15 and 16 to the steering post 17 and the handle bars 18 comprises a horizontally extending rod 37 linking together the flat bar arms 30 and 36. One terminal portion of the link 37 is turned upwardly and projected freely through the free terminal portion of the flat bar arm 30, as at 38, being secured against displacement by a cotter pin 39. The opposite terminal portion of the link 37 carries a two part fitting, one part of which, designated by the numeral 40, is threaded over the terminal link portion aforesaid, and the other part of which, designated by the numeral 41, extends laterally from the fitting part 40 and upwardly for rigid connection with an intermediate portion of the flat bar arm 36, the connection between the fitting parts 40 and 41 being of the ball and socket type. The interconnected cross bar 14, flat bar arms 30 and 36 and the link 37 form a parallel link system that is operative to keep the wheels 15 and 16 parallel to one another irrespective of the shifted position of the link 37 relative to the cross bar 14. Suitable movement limiting stops are provided at 41a—41a.

The connecting means 19 additionally comprises a horizontally extending rod 42 that links together the flat bar arm 36 and a horizontally disposed flat bar arm 43 which extends laterally from the lower extremity of the steering post 17, being rigidly secured to the latter, as by welding 44. One terminal portion of the link 42 is turned downwardly and projected freely through the free terminal portion of the flat bar arm 36, as at 45, being secured against displacement by a cotter pin 46. The opposite terminal portion of the link 42 carries a two part fitting, one part of which, designated by the numeral 47, is threaded over the terminal link portion aforesaid, and the other part of which, designated by the numeral 48, extends laterally from the fitting part 47 and upwardly for rigid connection with the free terminal portion of the flat bar arm 43, the connection between the fitting parts 47 and 48 being of the ball and socket type.

The steering post 17 extends through a vertically disposed tubular sleeve 49 that is secured to the front of the cross bar 14, as by welding 50, and is secured against displacement by a pair of washers 51—51 and pair of cotter pins 52—52.

Figure 3:
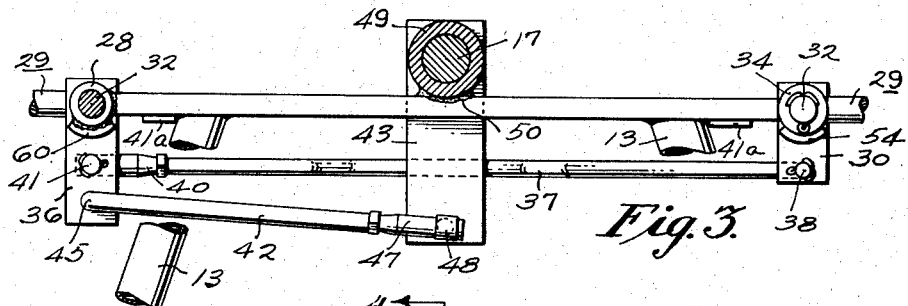
Figure 3 is a horizontal section on line 3—3 of Figure 2.

Through the medium of the handle bars 18, the steering post 17 may be turned either clockwise or counterclockwise, as viewed in Figure 3, depending upon whether it is desired to make a right or a left turn. To make a right turn, for example, the steering post 17 is turned clockwise, whereupon the flat bar arm 43 at the lower end of the steering post swings clockwise about the axis of the steering post 17. Through the medium of the links 42 and 37, the flat bar arms 36 and 30 swing clockwise respectively about the axes of the axle bar vertically extending branches 32—32, in consequence of which the front wheels 15 and 16 turn, as will be readily apparent from a comparison of Figures 1 and 3 with Figure 8.

The rear wheels 20 and 21 are mounted upon the rear axle 22 for turning in the same direction at the same rate of speed, even when the mobile frame is making a turn, i.e., no differential drive feature is incorporated in the rear running gear 12 per se. Instead, the front running gear is provided with a frame lifting cam arrangement now to be described.

Figure 2:
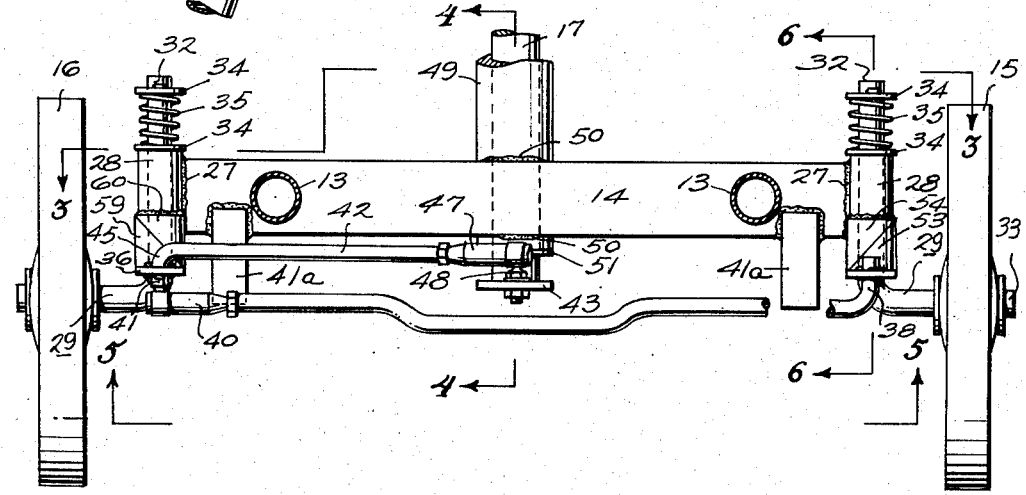
Figure 2 is an enlarged fragmentary section on line 2—2 of Figure 1.

Referring particularly to Figures 2, 6 and 10, just above the flat bar arm 30 and immediately to the rear of the tubular sleeve 28 is a vertically extending cam assembly that is arcuate in horizontal transverse section and split diagonally to form a cam 53 and follower 54. The lower end portion of the cam 53 is seated directly upon the upper surface of the flat bar arm 30 and is rigidly secured thereto, as by welding 55, the cam 53 being disposed thereby upright upon the arm 30 with the concave side thereof facing and abutting the tubular sleeve 28. The working surface of the cam 53 is the narrow peripheral edge thereof, designated by the numeral 56, inclined at an angle of approximately 45 degrees, as shown. The follower 54 is rigidly secured to the tubular sleeve 28, as by welding 57, being disposed thereby with the concave side thereof facing and abutting the tubular sleeve 28. The working surface of the follower 54 is the narrow peripheral edge thereof, designated by the numeral 58, inclined at an angle of approximately 45 degrees, as shown, and disposed in overlying abutting relation to the working surface 56 of the cam 53.

Immediately above the flat bar arm 36 is a vertically extending cam assembly identical with the cam assembly just described, albeit of opposite hand, the cam and follower being respectively designated 59 and 60.

As long as the mobile frame is traveling along a straight path, the cams and their followers on each side of the tractor are fully engaged and the fore end of the mobile frame remains level, as best shown in Figure 2. However, when the vehicle is turned to the right, as described hereinbefore, the cams 53 and 59 are turned in the same direction respectively by the flat bar arms 30 and 36 about the tubular sleeves 28—28, whereupon the working surfaces of the cam 53 and follower 64 slide over one another for raising the follower 54, and the working surfaces of the cam 59 and follower 60 separate. In consequence of the foregoing, the right fore corner of the frame 10 is raised by the cam 53 against the influence of the coil compression spring 35, while the left fore corner of the frame 10 remains at its initial elevation, as best shown in Figure 7.

When the right turn is completed, the steering post is turned back again, whereupon the cams 53 and 59 are turned in the opposite direction to their initial positions under the followers. The follower 54 and the right fore corner of the mobile frame are thereby lowered again and the fore end of the mobile frame is releveled, as shown in Figure 2.

It will be understood that when the vehicle is turned to the left, the operation is essentially the same as that just described, the cam 59 and follower 60 coacting and being operative to raise the left fore corner of the mobile frame relative to the right fore corner of the mobile frame.

When either fore end corner of the mobile frame is raised in the manner aforesaid, the weight of the vehicle is imposed principally upon the dirigible wheel under the raised corner of the frame and the traction wheel diagonally opposite the latter. The other dirigible wheel and traction wheel are in effect raised from the ground and carry no load, but as the loaded traction wheel rotates, it tends to depress the fore end of the mobile frame and cause the unloaded dirigible wheel to engage the ground and act as a balance wheel. Although the raised, unloaded traction wheel rotates in the same direction and at the same rate of speed as the loaded traction wheel, no effective traction is developed thereby, in consequence of which, while making a turn the vehicle is in effect a three wheeled vehicle, with a rear traction wheel located directly in line with one front dirigible wheel of an axially widely spaced pair thereof. For example, when making a right turn, the right fore corner of the mobile frame is raised, as shown in Figure 7. The weight of the vehicle is imposed upon the dirigible wheel 15 and the traction wheel 21, and the dirigible wheel 16 and the traction wheel 20 are, in effect, raised from the ground. Rotation of the traction wheel 21 to move the vehicle tends to depress the fore end of the frame, whereby the dirigible wheel 16 engages the ground and acts as a balance wheel. The traction wheel 20 being inoperative, the mobile frame is now in effect, a three wheeled vehicle. As the traction wheel 21 rotates, the vehicle turns right about the loaded dirigible wheel 15.

In view of the foregoing, it will be appreciated that the present invention provides for a mobile frame fitted with a pair of widely spaced front dirigible wheels and a pair of widely spaced rear traction wheels simple and convenient means for simulating a differential drive, to thereby facilitate steering of the vehicle.

It will be understood, of course, that the present invention is susceptible of various changes and modifications which may be made from time to time without departing from the general principles or real spirit thereof, and it is intended to claim the same broadly, as well as specifically, as indicated by the appended claims.

What is claimed as new and useful is:

1. A vehicle comprising a rigid horizontally extending frame structure, a pair of widely spaced dirigible wheels at one end of said structure, a pair of widely spaced traction wheels at the opposite end of said structure mounted in fixed relation to one another for rotation together in the same direction and at the same rate of speed at all times, steering means operatively connected to said dirigible wheels and operable for controlling the same, and means operatively interposed between said dirigible wheels and said frame structure and automatically responsive to operation of said steering means for changing the effective vertical distance between one of said dirigible wheels and the frame structure to thereby cant the dirigible wheel end of said frame structure and shift the weight of the vehicle to the dirigible wheel at the higher side of the dirigible wheel end of the frame structure and the diagonally disposed traction wheel.

2. A vehicle comprising a rigid horizontally extending frame structure generally rectangular in shape, a pair of widely spaced dirigible wheels at the fore end of said structure, a pair of widely spaced traction wheels at the aft end of said structure mounted in fixed relation to one another for rotation together in the same direction and at the same rate of speed at all times, steering means operatively connected to said dirigible wheels and operable for controlling the same, and means operatively interposed between said dirigible wheels and the fore end of said frame structure and automatically responsive to operation of said steering means for raising one side of the fore end of said frame structure relative to the dirigible wheel supporting the same to thereby slope the fore end of said frame structure downwardly toward the other dirigible wheel and shift the weight of the vehicle to the dirigible wheel supporting the raised corner of said frame structure and the diagonally disposed traction wheel.

3. A vehicle comprising a rigid horizontally extending frame structure generally rectangular in shape, a pair of dirigible wheel assemblies at the fore end and disposed respectively on opposite sides of said frame structure, each of said assemblies being pivotally mounted upon said frame structure for swinging movement about an upright axis and for shifting movement vertically relatively to said frame structure, a pair of traction wheels at the aft end and disposed respectively on opposite sides of said frame structure, said traction wheels being mounted in fixed relation to one another for rotation together in the same direction and at the same rate of speed at all times, steering means operatively connected to said dirigible wheel assemblies and operable for controlling the same, and means operatively interposed said dirigible wheel assemblies and the fore end of said frame structure and automatically responsive to operation of said steering means for selectively vertically shifting said frame structure to thereby raise one corner thereof relative to said dirigible wheel assemblies, slope the fore end of the frame structure and shift the weight of the vehicle to the dirigible wheel assembly supporting the raised corner of said frame structure and to the diagonally disposed traction wheel.

4. A vehicle as defined in claim 3 wherein a dirigible wheel assembly includes an axle one end portion of which operatively mounts the dirigible wheel, and the opposite end portion of which extends upright through a fore corner of the frame structure for turning therein and shifting axially relative thereto, and the frame structure raising means includes means fixedly associated respectively with said dirigible wheel assembly and frame structure and coacting when said dirigible wheel assembly is turned about said upright axle portion in a predetermined direction to raise said frame structure relative to said dirigible wheel assembly.

5. A vehicle as defined in claim 3 wherein a dirigible wheel assembly includes an axle one end portion of which operatively mounts the dirigible wheel, and the opposite end portion of which extends upright through a fore corner of the frame structure for turning therein and shifting axially relative thereto, and the frame structure raising means includes a cam element fixedly mounted upon the dirigible wheel assembly, and a follower element fixedly mounted upon the frame structure, said cam and follower elements coacting when said dirigible wheel assembly is turned about said upright axle portion in a predetermined direction to raise said frame structure relative to said dirigible wheel assembly.

6. A vehicle as defined in claim 3 wherein a dirigible wheel assembly includes an axle one end portion of which operatively mounts the dirigible wheel, and the opposite end portion of which extends upright through a fore corner of the frame structure for turning therein and shifting axially relative thereto, and the frame structure raising means includes a cam element fixedly mounted upon the dirigible wheel assembly, and a follower element fixedly mounted upon the frame structure, said cam and follower elements being provided with mutually overlying inclined working surfaces for coacting when said dirigible wheel assembly is turned about said upright axle portion in a predetermined direction to raise said frame structure relative to said dirigible wheel assembly.

7. A vehicle as defined in claim 3 wherein a dirigible wheel assembly includes an axle one end portion of which operatively mounts the dirigible wheel, and the opposite end portion of which extends upright through a fore corner of the frame structure for turning therein and shifting axially relative thereto, and yieldable means for securing said dirigible wheel assembly against axial shifting movement relative to said frame structure, and the frame structure raising means includes a cam element fixedly mounted upon the dirigible wheel assembly, and a follower element fixedly mounted upon the frame structure, said cam and follower elements being provided with mutually overlying inclined working surfaces for coacting when said dirigible wheel assembly is turned about said upright axle portion in a predetermined direction to raise said frame structure relative to said dirigible wheel assembly against the influence of said yieldable means.

8. A vehicle as defined in claim 3 wherein each dirigible wheel assembly includes an axle one end portion of which operatively mounts the dirigible wheel, and the opposite end portion of which extends upright through a tubular sleeve for turning therein and shifting axially relative thereto, said tubular sleeve being fixed relative to the frame structure, and a coil compression spring mounted upon the upper terminal portion of said upright axle portion and acting against the upper end of said sleeve to yieldably secure said dirigible wheel assembly against axial shifting movement relative to said frame structure, and the frame structure raising means includes a pair of cam assemblies each having a cam element fixedly mounted upon the associated dirigible wheel assembly, and a follower element fixedly mounted upon the associated tubular sleeve, said cam and follower elements being provided with mutually overlying inclined working surfaces, and the pair of cam assemblies being formed opposite hand to one another so that when said dirigible wheel assemblies are turned about said upright axle portions in a predetermined direction, the cam and follower elements of one of said cam assemblies coact to raise the associated corner of the frame structure relative to the associated dirigible wheel assembly against the influence of the associated coil spring, while simultaneously the cam and follower elements of the other cam assembly disengage.

No references cited.